Patented Nov. 7, 1933

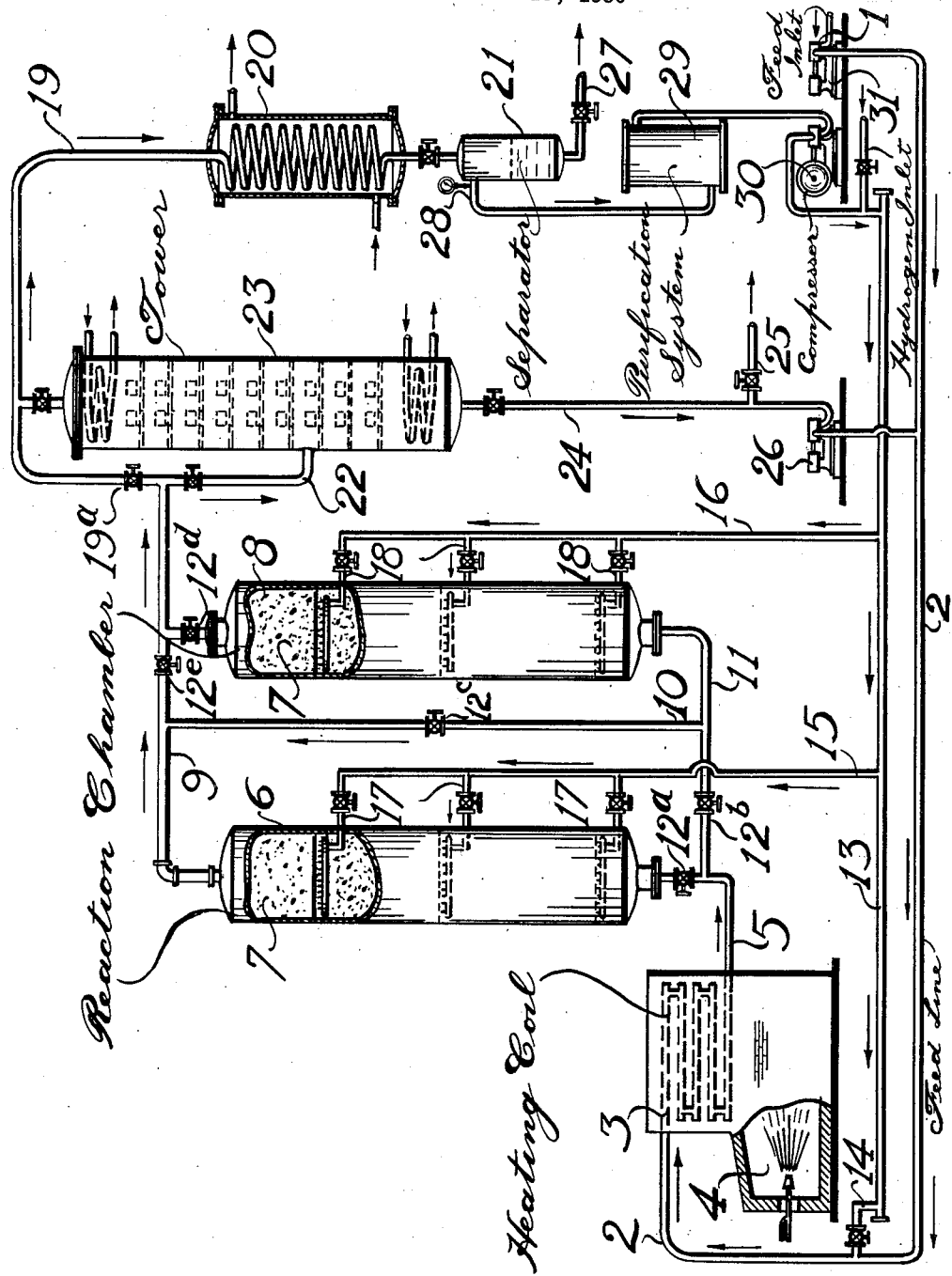

1,934,062

UNITED STATES PATENT OFFICE 1,934,062

PROCESS FOR PRODUCING LOW BOILING HYDROCARBONS FROM HIGHER BOILING HYDROCARBONS THROUGH THE ACTION OF HYDROGEN AT ELEVATED TEMPERATURES

Robert T. Haslam, Westfield, N. J., assignor to Standard-I. G. Company

Application March 13, 1930. Serial No. 435,460

5 Claims. (Cl. 196—53)

The present invention relates to a process for obtaining valuable refined hydrocarbon oils from crude or unrefined hydrocarbon oils by reaction of hydrogen under elevated temperature and pressure. My invention will be fully understood from the following description and drawing which illustrates one form of apparatus suitable for carrying out my invention.

The drawing is a diagrammatic view in sectional elevation of an apparatus constructed to carry out my invention and indicates the flow of the various materials in the process.

Referring to the drawing, a hydrocarbon oil distillate is fed from any convenient source (not shown) by pump 1 through line 2 into heating coil 3. The heating coil is mounted in a suitable furnace setting 4 and discharges through line 5 into reaction chamber 6. The reaction chamber is constructed of materials adapted to withstand temperatures in the neighborhood of 900 to 1200° F. and pressures of 3000 pounds per square inch or higher as well as the corrosive effect of the reactants under these conditions of temperature and pressure. Suitable catalytic material 7 is packed into the drum in any suitable manner for example, in small lumps. A second reaction chamber 8 similar to reaction chamber 6 is connected to the latter by lines 9, 10 and 11. By adjustment of valves 12a, 12b, 12c, 12d and 12e in these lines, the two reaction chambers may be connected in series or parallel, or operation may be carried out using but one drum while the other is cut out of the system.

Hydrogen is supplied under high pressure through header 13 and may be admitted to the coil inlet through pipe 14. Additional hydrogen may be added to the drums through lines 15 and 16. Each of these lines is provided with a plurality of branch connections 17 and 18 for supplying hydrogen selectively at several levels in the drums. The mixture of oil vapor and hydrogen, after passing through the reaction chamber, or chambers, is discharged into pipe 9 from which it may flow through line 19 into condenser 20 and separator 21. By a second alternative, the material from line 9 may be conducted through pipe 22 into fractionating tower 23. In this case valve 19a is closed and the heavier portions of the vapor are condensed and withdrawn from the bottom of the tower through line 24. This material may be removed from the system through line 25 or may be forced back to the inlet of coil 3 by means of pump 26 and line 2. The lighter vapors and hydrogen pass from the top of tower 23 to condenser 20 and separator 21. The condensate is withdrawn through line 27 to a storage tank (not shown) and gas is removed preferably under high pressure by line 28 to a purification system 29. If the fractionator is not used, it is preferable to distill the product from line 27 and return heavier portions to the system, for example; through pump 1 and line 2. The purification may be carried out by any convenient means such as scrubbing with heavy oils under pressure to remove hydrogen sulfide and the major quantity of gaseous hydrocarbons. Purified gas flows to booster compressor 30 and is circulated to line 13 as stated. Fresh or make-up hydrogen may be added by line 31.

The reaction which takes place in the hydrogenation of hydrocarbon oils is accompanied by substantial heat evolution, especially when operating in the vapor phase at temperatures above 900° F. I have found that this heat may profitably be used to aid in bringing the oil in the reaction chamber up to operating temperature. By this means the oil and hydrogen, or oil alone, is preheated in the coil to a temperature above about 800° F. and not exceeding about 860° F. or 900° F., as a maximum, depending on the product desired and the chamber operating temperature. The material is then discharged into the reaction chamber where contact with the catalyst promotes the hydrogenation reaction with concurrent evolution of heat. In my preferred form of operation, I allow this evolved heat to bring the temperature of the oil, inasmuch as the drum is well insulated, up to temperatures in excess of 900° F. and in most cases between 930 and 1025° F. However, if necessary, for example in starting up the equipment, I may supply heat by some means such as internal electric heaters, but in general I prefer to operate using the exothermic heat of reaction only.

The exact chamber temperature under which the process is carried out depends on the nature of the feed stock, being higher for more refractory stocks. If an aromatic product is desired it is preferable to operate in the upper range of temperatures, on the other hand the lower range is more suitable for saturated materials. The temperature in the chamber is adjusted by admission of cold hydrogen at selected points, or by variation of the coil outlet temperature. The oil in the preheating coil may be in the liquid or vapor phase and is preferably passed through the coil with sufficient velocity to limit decomposition in the coil to the production of 3 to 15 percent of light oils boiling below 400° F., although in certain cases it may be higher.

The pressure used, like temperature depends somewhat on the nature of the product desired, but should ordinarily be in excess of 20 atmospheres. The quantity of hydrogen which it is necessary to circulate is generally in excess of 1000 cubic feet per barrel of oil, usually being from 3000 to 5000 cubic feet per barrel, but may be in certain cases where more saturation is desired as high as 10,000 cubic feet.

The feed stocks which are suitable for my process preferably consist of distillate oils containing no asphaltic materials, such as heavy naphtha, kerosene, gas oil or unfinished gasolines. From these materials it is possible to produce valuable light oils, for example, motor fuels of excellent anti-knock characteristics. The feed rate is governed largely by the products desired and the temperature used and may vary from 0.8 to 3.0 volumes of oil per volume of reaction chamber per hour, although it may be in excess of this, particularly when higher temperatures are used and when charging low boiling point stocks.

Catalytic materials for use in the reaction drum may comprise materials such as chromium, molybdenum, or tungsten oxides, or other compounds or mixtures of these materials with each other or with other materials, for example alkaline earth compounds, rare earths, zinc oxide or alumina.

As an example of the operation of my process, a cracked gas oil boiling between 470° and 584° F., is selected as a feed stock. This is fed at 3000 pounds per square inch pressure together with hydrogen through a preheating coil and discharged into a catalytic chamber. The coil outlet temperature is maintained at about 850° F., the temperature of the mixture rising to 985° F. in the reaction chamber, the lump catalyst in which is composed of oxides of magnesium and tungsten. The oil is fed at a rate of 2 volumes of oil per volume of reaction chamber per hour with hydrogen in the ratio of 2200 cubic feet per barrel of oil. After leaving the reaction chamber the material passes into a fractionating tower where all vapors boiling above 400° F. are condensed and returned to the coil inlet for retreatment in the apparatus. The remainder of the vapors, which comprise 71 percent of the oil feed, consist of 400° F. end point gasoline possessing valuable anti-knock properties.

My invention is not to be limited by any theory of the mechanism of the chemical reaction or by any specific example of the means by which my process may be carried out, but only by the attached claims in which I wish to claim all novelty inherent in the invention.

I claim:

1. A process for preparing valuable light hydrocarbons of good anti-detonation properties from heavier hydrocarbon oils readily vaporizable under the conditions of reaction by destructive hydrogenation in vapor phase, which comprises preheating the oil in absence of materials possessing catalytic activity for promoting hydrogenation, to a temperature between 800 and 900° F., bringing the heated oil into contact with an active hydrogenating catalyst in the presence of free hydrogen and under pressure in excess of 20 atmospheres, whereby the vaporization of the oil is completed and the vapors are raised to and maintained for a sufficient reaction time at a temperature above 900° F. solely by the exothermic heat of reaction.

2. Process according to claim 1 in which the initial higher boiling hydrocarbons are preheated to a temperature above 800° F. but below 860° F.

3. Process according to claim 1 in which the heavy oil is preheated in admixture with hydrogen to a temperature above 800° F. but below 900° F.

4. Process according to claim 1 in which the material introduced into the reaction zone is brought to a temperature above 930° F. solely by the exothermic heat of reaction.

5. An improved process for producing anti-knock motor fuel from heavier hydrocarbons comprising passing a distillate oil readily vaporizable under the reaction conditions through a heating zone wherein it is heated substantially in liquid phase to 800 to 900° F., then discharging the oil with hydrogen into a reaction zone containing an active hydrogenation catalyst, maintaining a hydrogen pressure in excess of 20 atmospheres whereby vaporization of the oil is completed, temperature is raised above 900° F. and reaction accomplished in the vapor phase at such temperature solely by the exothermic heat of reaction.

ROBERT T. HASLAM.